United States Patent
Odenthal

(10) Patent No.: US 7,357,327 B2
(45) Date of Patent: Apr. 15, 2008

(54) SYSTEM AND METHOD FOR ASSOCIATING MACHINE READABLE INFORMATION AND DIMENSIONING DATA FOR CONVEYOR BORNE PACKAGES

(75) Inventor: James Paul Odenthal, Phoenixville, PA (US)

(73) Assignee: Accu-Sort Systems, Inc., Telford, PA (US)

( * ) Notice: Subject to any disclaimer, the term of this patent is extended or adjusted under 35 U.S.C. 154(b) by 229 days.

(21) Appl. No.: 10/563,341

(22) PCT Filed: Feb. 19, 2004

(86) PCT No.: PCT/US2004/004980

§ 371 (c)(1),
(2), (4) Date: Feb. 8, 2006

(87) PCT Pub. No.: WO2005/013182

PCT Pub. Date: Feb. 10, 2005

(65) Prior Publication Data

US 2006/0192013 A1 Aug. 31, 2006

Related U.S. Application Data

(60) Provisional application No. 60/484,024, filed on Jul. 1, 2003.

(51) Int. Cl.
*G06K 7/10* (2006.01)

(52) U.S. Cl. .............................. 235/472.01; 235/462.01

(58) Field of Classification Search ..............
235/462.01–462.45, 472.01, 472.02, 472.03,
235/454, 455, 470, 375

See application file for complete search history.

(56) References Cited

U.S. PATENT DOCUMENTS

| | | | |
|---|---|---|---|
| 5,477,044 A | 12/1995 | Aragon | |
| 6,360,947 B1 | 3/2002 | Knowles et al. | |
| 6,382,515 B1 | 5/2002 | Good et al. | |
| 6,705,526 B1 * | 3/2004 | Zhu et al. | 235/472.01 |
| 6,971,580 B2 * | 12/2005 | Zhu et al. | 235/472.01 |
| 2002/0179708 A1 * | 12/2002 | Zhu et al. | 235/454 |
| 2006/0151604 A1 * | 7/2006 | Zhu et al. | 235/454 |

* cited by examiner

*Primary Examiner*—Thien Minh Le
(74) *Attorney, Agent, or Firm*—Nelson Mullins Riley & Scarborough, LLP

(57) ABSTRACT

A method for associating machine readable information (12) on singulated or non-singulated packages (15) on a conveyor (50) with dimensioning data provided. The method includes orienting a handheld scanner (14) toward package (15) on the conveyor (50) to read machine readable information on the package. A specific time and pose data of the scanner are determined when the machine readable information is read. A beam vector (44) is determined using the pose data, as well as a conveyor position at the specific time. When an associated portion of the conveyor reaches dimensioning station, dimensioning data for a package is obtained. The dimensioning data is correlated with the beam vector to associate the dimensioning data for the package with the corresponding machine readable information read by the handheld scanner. A system for providing the method is also provided.

11 Claims, 3 Drawing Sheets

FIG. 1
(PRIOR ART)
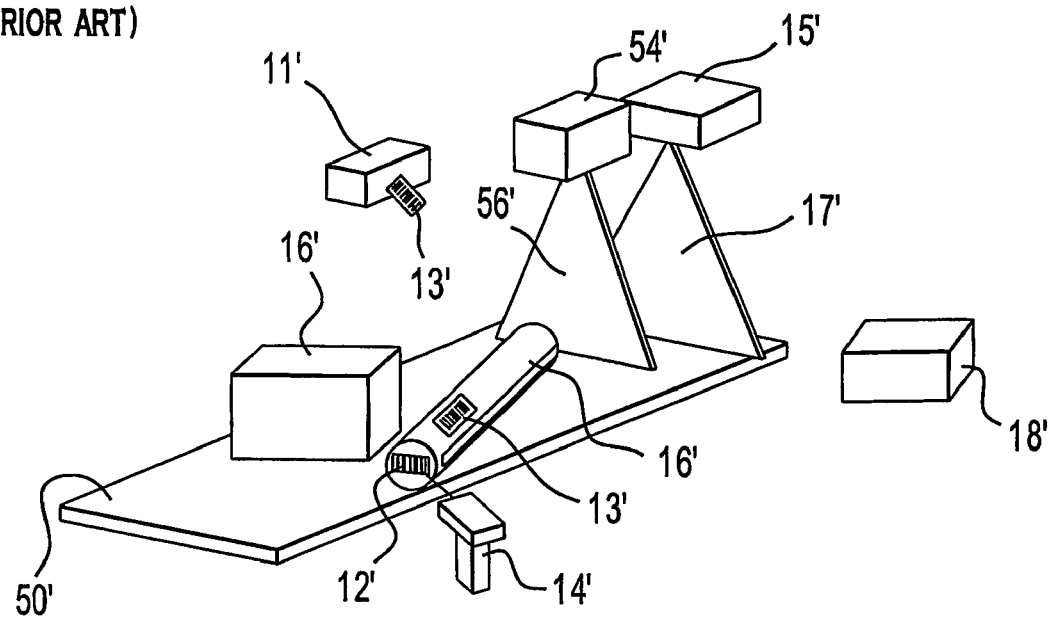
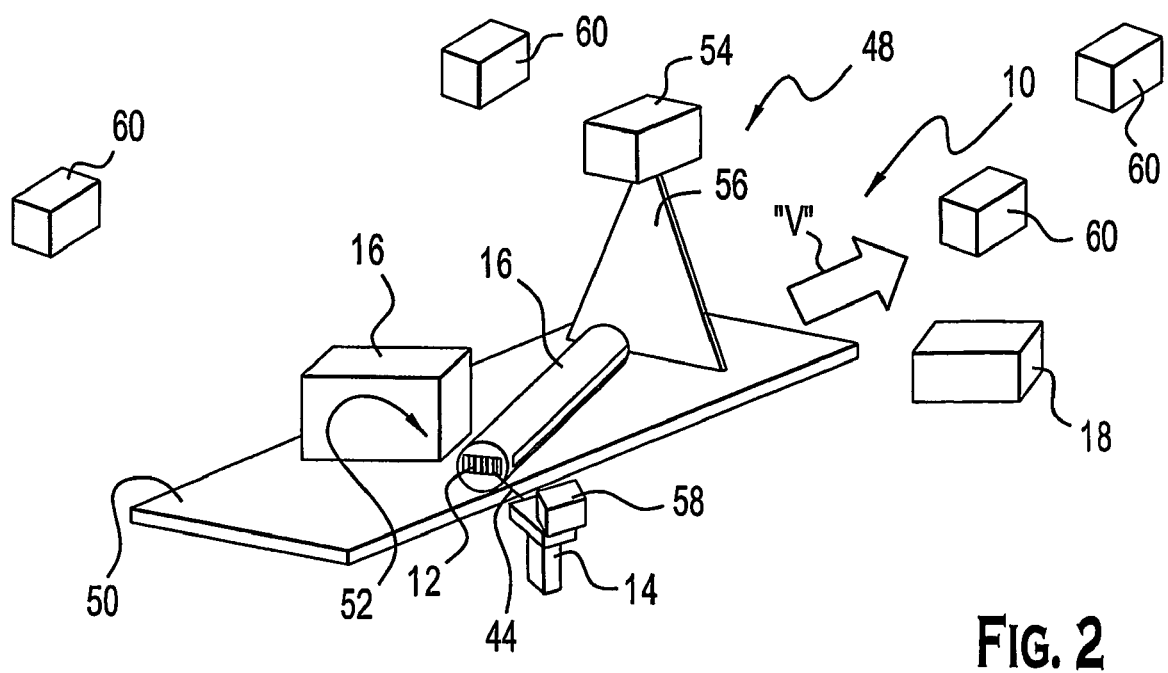
FIG. 2

SYSTEM AND METHOD FOR ASSOCIATING MACHINE READABLE INFORMATION AND DIMENSIONING DATA FOR CONVEYOR BORNE PACKAGES

BACKGROUND

The present invention is generally directed to package processing technology and, more specifically, is directed to a system and method for associating machine readable information and dimensioning data for packages.

For proper pricing, processing, and/or shipping of packages it is preferable to determine and record the shape of a package and to identify that package with machine readable information located thereon, such as a bar code or the like. This process typically requires a bar code scanner and a mechanism for dimensioning individual packages.

Referring to FIG. 1, conventional systems use a fixed bar code scanner 15' and fixed profile scanners 54' to dimension a package and to associate a bar code 12' therewith. Such a system is problematic when used with non-singulated packages 16' which may be positioned at odd angles or positioned in a side-by-side fashion along a width of a conveyor 50' during the scanning process. Additionally, irregularly shaped packages often result in bar codes 12' being oriented so as to not be readable by the bar code scanner 15'.

One conventional method of overcoming the above difficulties, is to scan bar code labels 12' with a handheld scanner 14' when those bar code labels 12' are not oriented properly for reading by the fixed bar code scanner 15'. The handheld scanner 14' transmits the bar code information to a label printer 11' that prints a duplicate label 13' that is then placed on the package 16' in a position suitable for scanning by the bar code scan beam 17'. Once the duplicate label 13' is properly positioned on the package 16', the conveyor 50' transports the package 16' through a profile scan area 56' for a fixed profile scanner 54'. Corresponding shape and/or volume data is then communicated to a controller 18'. Then, the package 16' is transported through a bar code scan area 17' where the duplicate label 13' is read by the fixed bar code scanner 15' and the corresponding information is transmitted to the controller 18'. Once all of the information for a particular package 16' is received by the controller 18', the package 16' is appropriately processed. This system is necessarily inefficient and slow due to the need to affix duplicate labels 13' on at least some packages 16'. Additionally, the system is more prone to errors when non-singulated items are transported on the conveyor 50'. Therefore, singulation of the packages is required in some cases. Additional mistakes are also likely due to the need to manually affix duplicate labels 13'for improperly placed bar code labels 12'. There are also additional costs associated with the system due to the need for label printers, label stock replenishment, etc.

It would advantageous to provide a system for associating machine readable information with dimensioning data for packages which may be non-singulated: that does not require the printing and placement of duplicate labels on packages; that eliminates the need for a fixed bar code scanner; and that can process non-singulated packages at a faster rate than otherwise possible.

SUMMARY

A method for associating machine readable information on singulated or non-singulated packages on a conveyor with dimensioning data is provided. The method includes orienting a handheld scanner toward a package on the conveyor to read machine readable information on the package. A specific time and pose data of the scanner are determined when the machine readable information is read. A beam vector is determined using the pose data, as well as a conveyor position at the specific time. When an associated portion of the conveyor reaches a dimensioning station, dimensioning data for a package is obtained. The dimensioning data is correlated with the beam vector to associate the dimensioning data for the package with the corresponding machine readable information read by the handheld scanner.

In another aspect of the invention, a system for performing the above-described method is provided. A conveyor for transporting packages thereon, a movable handheld scanner located in an area proximate to the conveyor, and a position detector that determines a three dimensional position and a pitch, a roll, and a yaw of the scanner are provided. A controller receives a signal from the position detector for determining a beam vector between the scanner and the machine readable information on one of the packages when the machine readable information is read by the handheld scanner. The controller determines an associated portion of the conveyor that corresponds to the beam vector. A dimensioning station is provided for determining dimensioning data for a package on the associated portion of the conveyor. The controller correlates the dimensioning data with the beam vector to associate the dimensioning data with the package bearing the corresponding machine readable information.

BRIEF DESCRIPTION OF THE DRAWINGS

The following detailed description of the preferred embodiment of the present invention will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings:

FIG. 1 is a perspective view of a prior art system for acquiring dimensioning data and machine readable information for packages transported on a conveyor;

FIG. 2 is a perspective view of a system for associating machine readable data with dimensioning data for package borne conveyors according to a preferred embodiment of the present invention;

DETAILED DESCRIPTION OF THE PREFERRED EMBODIMENT

Figure 4:
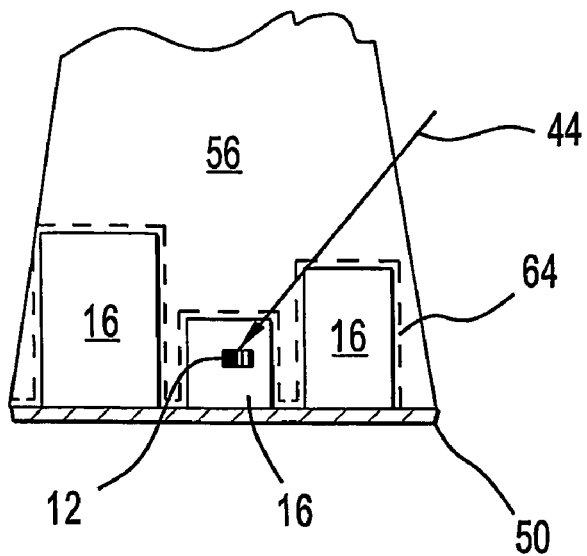
FIG. 4 is a cross-sectional view of the system of the present invention illustrating a cross-section of the conveyor and packages thereon as taken along a path of a profile scanning beam.

Certain terminology is used in the following description for convenience only and is not limiting. The words "right,"

"left," "top," and "bottom," designate directions in the drawings to which reference is made. The words "inwardly" and "outwardly" refer to directions toward and away from, respectively, the geometric center of the system for associating machine readable information with dimensioning data and designated parts thereof. The term "freely movable handheld scanner" as used in the claims and in corresponding portions of the specification, means "a handheld scanner that is not attached to a three axis gimbal or mechanical linkage; however, the handheld scanner may be tethered by any combination of a power line, a signal line, and a flexible security line/cable." The words "a" and "one" are defined as including one or more of the referenced item unless specifically stated otherwise. This terminology includes the words above specifically mentioned, derivatives thereof, and words of similar import.

Figure 3:
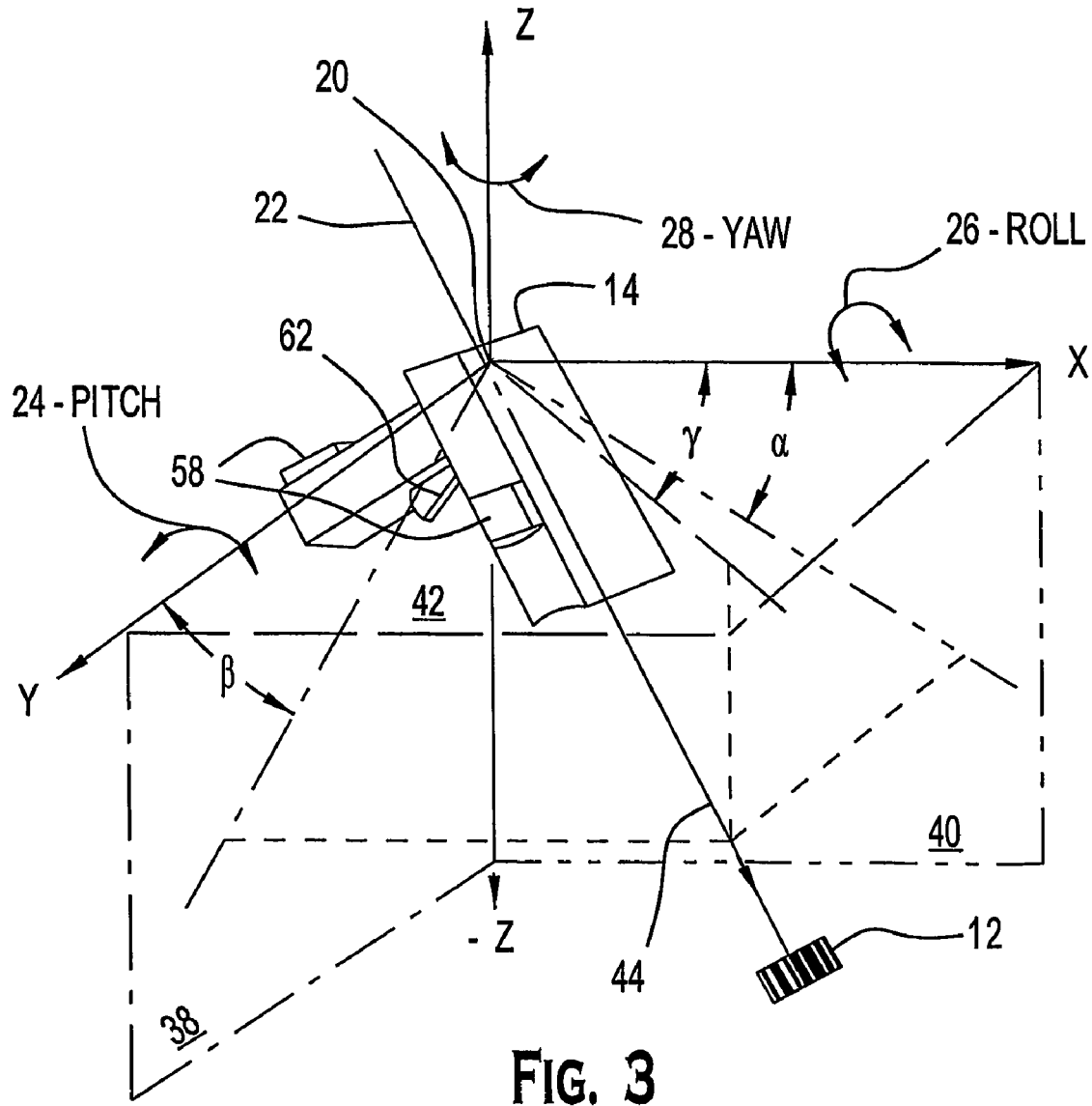
FIG. 3 is an enlarged view of a handheld scanner of the system shown in FIG. 2.

Referring to FIGS. 2 and 3, wherein like numerals indicate like elements throughout, a preferred embodiment of a system for associating machine readable information with dimensioning data, generally designated 10, is shown. Briefly stated, the system 10 is adapted to read machine readable information 12, such as a bar code, located on a conveyor borne package 16 using a handheld scanner 14. Dimensioning data for the package 16 bearing the machine readable information 12 is also gathered by a profile scanner 54 or dimensioning system. The system 10 tracks the position of the handheld scanner 14 when the machine readable information 12 is scanned to determine the location of the machine readable information 12 with respect to an associated portion 52 of the conveyor 50. This data is then used to associate the preferably later acquired dimensional data for a given package 16 with the corresponding machine readable information 12 that was previously scanned.

The preferred method of the present invention for associating machine readable information 12 on conveyor borne, non-singulated packages 16 with dimensioning data is described below along with the elements of the system 10 of the present invention. It is understood that the steps of the method need not be performed in a specific order and can be interchanged without departing from the scope of the present invention.

Referring to FIG. 2, the method of the present invention includes orienting the handheld scanner 14 toward a package 16 on the conveyor 50 to read machine readable information 12 on the package 16. The machine readable information is then transmitted to the controller 18. It is preferred that the controller 18 is a computer adapted to process machine readable information on the non-singulated packages 16.

The handheld scanner 14 is preferably a freely movable scanner that is not tethered except for possibly by a power line, a signal output line, and/or a security cable/line. However, it is possible to use a handheld scanner connected to a multi-axis gimbal or a mechanical linkage, as long as all the degrees of freedom for movement of the handheld scanner 14 are maintained.

When a signal output line is not used with the handheld scanner 14, the handheld scanner transmits the machine readable information 12 to the controller 18 via either a radio frequency signal or an infrared signal. Those of ordinary skill in the art will appreciate from this disclosure that other known methods of transmitting data from the handheld scanner 14 to the controller 18 can be used without departing from the scope of the present invention.

Referring to FIG. 3, it is preferred that the handheld scanner 14 reads the machine readable information 12 in response to activation of a trigger 62 on the handheld scanner 14.

The method of the present invention includes determining a specific time or count when the machine readable information 12 is read. As described below, the specific time or count will be used by the controller 18 to associate the appropriate dimensioning data for the package 16 with the machine readable information.

In accordance with the method of the present invention, the pose (which includes both position and rotation data) for the handheld scanner 14 is determined when the machine readable information is read. It is preferred that the pose is gathered by a position detector (illustrated collectively by ultrasonic transmitters 60 which are located, for example, on the ceiling of the room where the scanning takes place, and ultrasonic receivers 58 located on the handheld scanner 14). The pose is obtained by the interaction between the plurality of ultrasonic transmitters 60 located proximate to the conveyor 50 and the plurality of ultrasonic receivers 58 located on the handheld scanner 14. It is preferred but not necessary, to use nine ultrasonic transmitters 60 in combination with four ultrasonic receivers 58. One such ultrasonic system position detection system which could be applied to a handheld scanner is available from Intersense Ultrasonic.

Those of ordinary skill in the art will appreciate from this disclosure that other known methods of determining the pose of the handheld scanner 14 can be used without departing from the scope of the present invention. For example, a three axis gimbal, with such systems being available from Space Age Controls, or a mechanical linkage can be used to determine the pose of the handheld scanner 14, such as available from Analogous. However, these systems do not allow as easy handling of the scanner as the ultrasonic system.

Preferably, the pose of the handheld scanner 14 is reported to the controller within a fixed time increment derived from the placement tolerance. In the preferred ultrasonic system, the pose of the handheld scanner 14 is determined at a rate of 200 hundred times per second or faster. Upon the trigger of the scanner 14 being activated, and the controller 18 obtaining a valid read, pose information for the scanner 14 at the time increment closest to the trigger activation is stored in the controller 18. However, continuous sampling is not necessary, and the system only requires a single pose reading per label.

Referring to FIG. 3, the pose data that is obtained for the handheld scanner 14 includes a three dimensional origin location 20 and a pitch 24, a roll 26 and a yaw 28 of the handheld scanner 14. The three dimensional origin location 20 is determined relative to a three dimensional coordinate axis using a predetermined point on the handheld scanner 14. The three dimensional location 20 of the handheld scanner 14 need not be located at the origin of the reference three dimensional coordinate axis, but is shown as such for convenience of illustration only.

The pitch 24 represents rotation of the handheld scanner 14 about the Y axis such that a plane extending through the Y axis and the scanner axis 22 intersects the X-Z plane 38 at a pitch angle "a." The roll 26 corresponds to the rotation of the handheld scanner 14 about the X axis such that a plane extending through the X axis and the scanner axis 22 intersects the Y-Z plane at a roll angle "B." The yaw 28 represents the rotation of the handheld scanner 14 about the Z axis such that a plane extending through the Z axis and the scanner axis 22 intersects the X-Y plane at a yaw angle "y."

By determining the X, Y, Z location 20 and the pitch 24, the roll 26, and the yaw 28, the position and orientation of a beam vector 44 of the handheld scanner 14 can be determined at the moment that the machine readable information is read. The beam vector 44 is preferably generally symmetrically located along a scanner axis 22. When the X, Y, Z location and the pitch 24, roll 26, and yaw 28 are identified, the X, Y, Z location along with the intersection of the roll 26, pitch 24, and yaw 28 define the scan beam vector 44.

Figure 5:
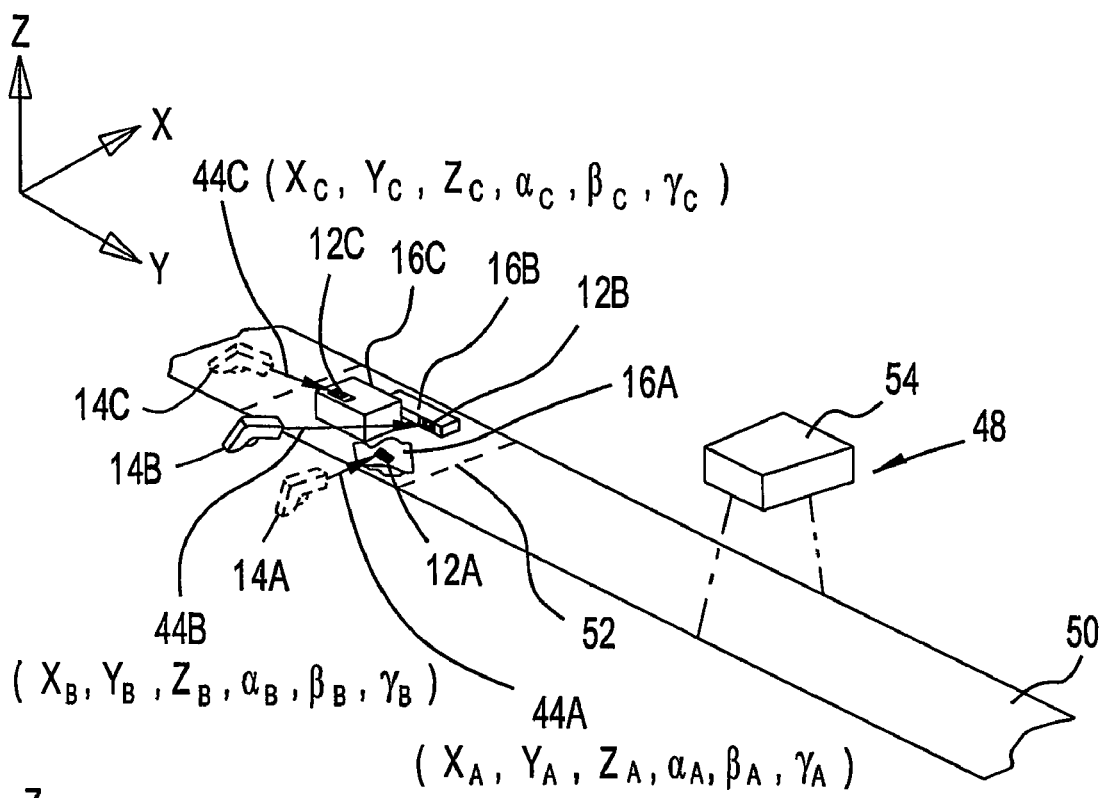
FIG. 5 is a perspective view of the system of the present invention, shown scanning packages at a predetermined portion of the conveyor.
Figure 6:
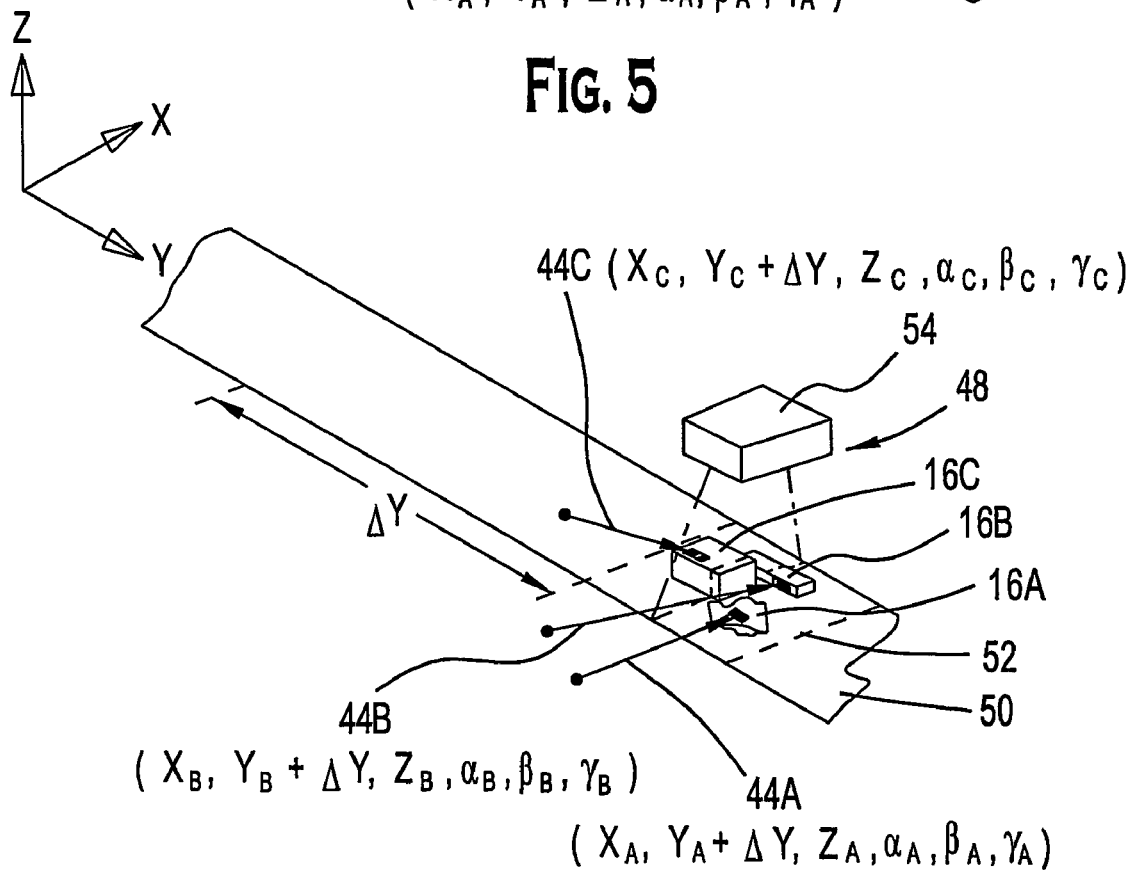
FIG. 6 is a perspective view similar to FIG. 5 showing the packages at the predetermined portion of the conveyor after it has moved to the dimensioning system, with the relative scan beam vectors being represented transposed by V$\Delta$t.

The pose for the scan beam vector 44 is stored by the controller 18, which uses it along with the position of the conveyor 50, preferably read by an odometer which counts changes in the belt position, or other count to associate the machine readable information with the dimensioning data for each package 16 based on the conveyor location. Referring to FIGS. 5 and 6, the handheld scanner 14 is shown in three positions 14A, 14B and 14C scanning the machine readable information on three different packages 16A, 16B and 16C. The handheld scanner 14 can be moved in any direction to allow the handheld scanner 14 to send a scan beam 44A, 44B, 44C over a larger package to read machine readable information located on a smaller adjacent package. The beam vector 44A, 44B, 44C at the time of scanning is in effect associated with a portion 52 of the conveyor 50 carrying the packages 16A, 16B, 16C when the machine readable information 12 is read. This results in the controller 18 knowing the precise location of beam vector 44 when the machine readable information 12 is read relative to the associated portion 52 of the conveyor 50.

While the conveyor 50 is preferably and endless belt conveyor, those of ordinary skill in the art will appreciate from this disclosure that the conveyor can be a set of rollers, a chain conveyor, or any other known conveyor without departing from the present invention. In the event that the conveyor is made up of adjacent rollers or the like, it is understood that the associated portion 52 of the conveyor 50 is treated as if it were part of a belt and thus the controller calculates the position of the associated portion 52 as moving along with the package 16 located thereon.

The position of the conveyor 50 is determined and used in conjunction with the specific pose to determine when the associated portion 52 of the conveyor 50 reaches a dimensioning station 48, as shown in FIG. 6. The dimensioning station 48 preferably includes a profile scanner 54 that has a profile scan field 56. However, those of ordinary skill in the art will appreciate from this disclosure that any known means for dimensioning packages can be used without departing from the scope of the present invention.

Dimensioning data, such as height, width, and length measurements, is obtained for the at least one package 16A, 16B, 16C on the associated portion 52 of the conveyer 50. While it is preferred that the machine readable information 12 is read prior to the gathering of the dimensioning data, the machine readable information 12 can be read simultaneously with or after the gathering of the dimensioning data without departing from the scope of the present invention. The dimensioning data is collected by the profile scanner 54 of a dimensioning system which measures the height and width of successive cross-sections of the packages 16A, 16B, 16C.

The dimensioning data for each package 16A, 16B, 16C is correlated to the first intersecting one of the beam vectors 44A, 44B, 44C, etc., of the associated portion of the conveyor 50 by the controller 18 to associate the shape of the package 16 with the associated machine readable information 12 read by the hand held scanner 14.

Referring to FIG. 4, a cross-sectional view of the conveyor 50 and supported packages is shown as taken along the path of the profile scanning beam 56. The three packages 16 are located thereon with the middle package being, for example, smaller in height than either of the other two and also having the machine readable information positioned so as not to be readable by conventional fixed scanners that may be located above the conveyor 50. The profile scanner 54 determines a profile 64 that includes the outer perimeter of each of the packages. By determining successive profile data, the shape of each package 16 can be determined.

The controller 18 matches individual package dimensioning data with machine readable information 12 by preferably calculating when a scan beam vector 44A, 44B, 44C intersects a package profile on the associated portion 52 of the conveyor 50 based on the conveyor position and the position of the scan beam vector 44A, 44B, 44C.

The controller 18 extrapolates the corresponding scan vector 44 as if the handheld scanner 14 were simultaneously reading the machine readable data 12 from the same position relative to the associated portion 52 of the conveyor as when the machine readable information was scanned, as represented in FIG. 6. This allows the controller 18 to associate the package dimensions with the correct machine readable information 12. It is preferred that the correlations include correlating the shape of the package 16 with the machine readable information 12.

Referring to FIGS. 2-6, one embodiment of the present invention operates as follows: packages 16, which can be non-singulated, are transported along a conveyer 50. A hand held scanner 14 is directed toward the machine readable information 12 on one of the packages 16 and the trigger 62 is activated. The machine readable information 12 is read by the hand held scanner 14 which then transmits the information to the controller 18. The controller 18 uses the position detector 58, 60 to determine a three dimensional location of the hand held scanner 14 and a pitch 24, a roll 26, and a yaw 28 of the hand held scanner 14 at the time of the successful read. This pose data is used by the controller 18 to determine an associated beam vector 44 to the machine readable information.

The conveyor 50 transports the packages 16 through a dimensioning station 48 to gather dimensioning data. The controller 18 uses the conveyor location at the time during which the machine readable information 12 was read in combination with the associated beam vector 44 position to determine which machine readable information 12 should be associated with the gathered dimensioning data. The controller 18 calculates which set of package dimensioning data is intersected by the beam vector 44 to associate the machine readable information 12 with the particular dimensioning data. This can be done for single or multiple packages 16 that are simultaneously sized by the dimensioning station 48.

The system 10 and method for associating machine readable information 14 with dimensioning data allows faster processing of irregularly and/or non-singulated packages 16 and reduces processing errors created by reliance on multiple manual steps. It will be recognized by those skilled in the art that changes may be made to the above described embodiment of the invention without departing from the inventive concept thereof. It is understood, therefore, that this invention is not limited to the particular embodiment disclosed, but is intended to cover all modifications which are within the spirit and scope of the invention as defined by the appended claims and/or as shown in the attached drawings.

What is claimed is:

1. A method for associating machine readable information on singulated or non-singulated packages carried on a conveyor with dimensioning data, comprising:

orienting a handheld scanner toward a package on the conveyor to read machine readable information on the package and transmitting the machine readable information to a controller;

determining a specific time when the machine readable information is read;

determining pose data of the handheld scanner when the machine readable information is read, wherein the pose data comprises a three dimensional location and a pitch, a yaw, and a roll of the handheld scanner;

determining a beam vector with the controller using the pose data;

determining a conveyor position at the specific time;

using the conveyor position and the specific time to determine when an associated portion of the conveyor reaches a dimensioning station;

obtaining dimensioning data for at least one package on the associated portion of the conveyor; and correlating the dimensioning data with the beam vector in the controller to associate the dimensioning data for the package with the corresponding machine readable information read by the handheld scanner.

2. The method of claim 1, wherein the handheld scanner is not tethered except for a power line and/or a signal output line.

3. The method of claim 1, wherein the handheld scanner is not tethered.

4. The method of claim 3, further comprising the handheld scanner transmitting to the controller via a radio frequency signal.

5. The method of claim 3, further comprising the handheld scanner transmitting to the controller via an infrared signal.

6. The method of claim 1, wherein the step of determining the pose data includes obtaining data from a plurality of ultrasonic transmitters located proximate to the conveyor and a plurality of ultrasonic receivers located on the handheld scanner.

7. The method of claim 1, wherein the machine readable information is read prior to obtaining the dimensioning data.

8. The method of claim 1, further comprising reading the machine readable information in response to activation of a trigger on the handheld scanner.

9. A system for correlating machine readable information with dimensioning data for conveyor borne singulated or non-singulated packages, comprising:

a conveyor adapted to transport a plurality of packages thereon, at least some of the packages bearing machine readable information;

a movable handheld scanner located in an area proximate to the conveyor;

a position detector that determines a three dimensional position and a pitch, a roll, and a yaw of the movable handheld scanner;

a controller that receives at least one signal from the position detector and is adapted to determine a beam vector between the movable handheld scanner and the machine readable information on one of the plurality of packages when the machine readable information is read by the handheld scanner, the controller being adapted to determine an associated portion of the conveyor that corresponds to the beam vector; and a dimensioning station for determining dimensioning data for the at least one package on the associated portion of the conveyor, the controller being adapted to correlate the dimensioning data with the beam vector to associate the dimensioning data with the one of the plurality of packages bearing the corresponding machine readable information.

10. The system of claim 9, wherein the position detector comprises:

a plurality of receiver sensors disposed on the movable handheld scanner; and a plurality of transmitting sensors located in an area where the handheld scanner is used, the transmitting sensors communicating with the plurality of receiver sensors to determine a three dimensional position of, a roll of, a pitch of, and a yaw of the movable handheld scanner.

11. The system of claim 9, wherein the position detector comprises:

a first plurality of sensors disposed on the movable handheld scanner; and a second plurality of sensors located in an area where the handheld scanner is used, the second plurality of sensors communicating with the first plurality of sensors to determine a three dimensional position of, a roll of, a pitch of, and a yaw of the movable handheld scanner.

* * * * *

UNITED STATES PATENT AND TRADEMARK OFFICE
CERTIFICATE OF CORRECTION

PATENT NO. : 7,357,327 B2 Page 1 of 1
APPLICATION NO. : 10/563341
DATED : April 15, 2008
INVENTOR(S) : James Paul Odenthal It is certified that error appears in the above-identified patent and that said Letters Patent is hereby corrected as shown below:

In column 4, line 57, please delete the letter "a" and replace with --α--.
In column 4, line 60, please delete the letter "B" and replace with --β--.
In column 4, line 63, please delete the letter "y" and replace with --γ--.

Signed and Sealed this

Fifteenth Day of July, 2008

JON W. DUDAS
*Director of the United States Patent and Trademark Office*